F. GRUSCHOW.
FAUCET.
APPLICATION FILED FEB. 9, 1906.
974,878.
Patented Nov. 8, 1910.
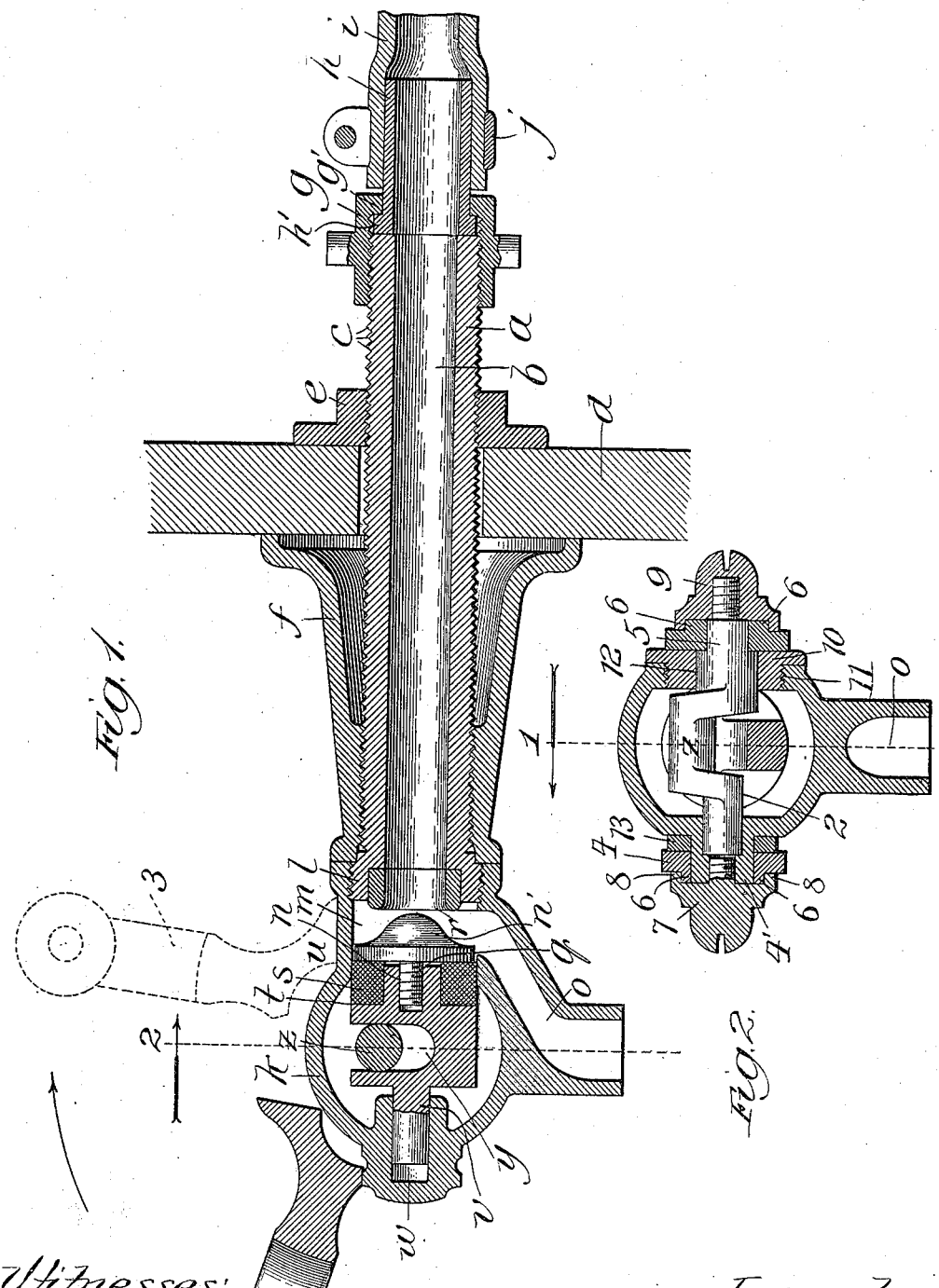
Witnesses:
Inventor:
Frank Gruschow,
By Thomas F. Sheridan,
Atty.

UNITED STATES PATENT OFFICE.

FRANK GRUSCHOW, OF CHICAGO, ILLINOIS.

FAUCET.

974,878.      Specification of Letters Patent.      Patented Nov. 8, 1910.

Application filed February 9, 1906. Serial No. 300,284.

*To all whom it may concern:*

Be it known that I, FRANK GRUSCHOW, a citizen of the United States, residing at Chicago, in the county of Cook and State of Illinois, am the inventor of certain new and useful Improvements in Faucets, of which the following is a specification.

My invention relates to that class of faucets having a valve mounted upon or in engagement with the crank shaft, and provided with an operating lever for turning the shaft and thereby throwing the valve into open and closed position, as desired.

The principal object of my invention is to provide a simple, economical and efficient faucet.

A further object of the invention is to provide a faucet with means whereby the discharge passage therethrough may be opened and closed quickly and the valve locked in closed position and whereby such passage may be left clear of all obstructions, when the valve is in open position, so that the liquid need not flow around or through the valve.

Other and further objects of the invention will appear from an examination of the drawings and the following description and claims.

In the accompanying drawings—Figure 1 is a longitudinal sectional view of a faucet constructed in accordance with my improvements; and Fig. 2 a transverse sectional elevation, taken on line 2 of Fig. 1, looking in the direction of the arrow.

In constructing a faucet in accordance with my improvements, I provide a stem $a$ having an axial opening or passage $b$ therethrough, and an external thread $c$ extending preferably throughout its entire length. This stem is adapted to be used as a hollow plug for a cask when it is desirable to mount it directly upon the cask, or it may be mounted in the wall of an ice-box or other structure when it is desired to place the cask to be tapped at a distance from the faucet or on the opposite side of a wall or partition.

In the accompanying drawings, the faucet is shown mounted in a wall $d$ to which it is firmly secured by means of the external threads already mentioned, and by a threaded nut $e$ and conical sleeve $f$ mounted upon opposite sides of the wall and in threaded engagement with the stem of the faucet. The rear end of the stem is provided with a suitable coupling comprising a coupling nut $g$ and a shouldered inner coupling sleeve $h$ upon which is mounted a tube $i$ which extends into the cask to be tapped, and which is attached to the coupling by means of a split ring $j$, or in any ordinary and well-known manner. The coupling nut is, of course, provided with an inner shoulder $g'$ which engages an external annular shoulder $h'$ of the coupling sleeve and forms a tight engagement between such sleeve and the end of the faucet stem.

In the art to which this invention relates, it is desirable to provide a faucet with means whereby the passage through which the liquid is discharged may be left free of all impediments to the flow of the liquid when open and whereby such passage may be quickly opened and closed. It is also desirable, particularly when the faucet is to be used for beer, that the passage be of substantially uniform cross sectional area slightly tapering at the discharge end, but not narrowed or obstructed by the valve when such valve is in its open position, so as to prevent an undesirable foaming of the liquid which occurs in known devices as it passes either around or through the valve. To accomplish this purpose and to enable the valve to be quickly opened and closed and locked in closed position, I provide a shell or main body portion $k$ which is mounted upon and in threaded engagement with the shouldered end $l$ of the hollow stem, such main body portion or shell having a cylindrical bore $m$ in which is slidably mounted a suitable valve $n$. The discharge passage $o$ communicates with the axial passage in the stem of the faucet and extends downward and outward, preferably at an incline, from the point of convergence between the cylindrical bore in which the valve is mounted, the axial passage of the stem and the inclined discharge passage. The valve is provided with a suitable head attached thereto by a screw $q$ and adapted to engage the valve seat $r$ and tightly close the discharge passage when such valve is in its closed position. This valve seat is formed by a rubber ring, or any other suitable material, mounted in the end of the stem. A packing ring *s* is mounted between the shoulder *t* of the valve and the valve head. The packing ring thus fills the space between the collar or valve and the walls of the cylindrical bore in which such valve is mounted. It is obvious that by means of the screw *q* the valve head may be adjusted so as to compress the packing ring *s* and crowd it against the surrounding wall with the desired degree of pressure. The front end of the valve is provided at its axial center with a cylindrical stud or boss *v* which forms a guide and support for the valve and which is slidably mounted in a cylindrical slot or bore *w* in the main body portion of the faucet.

In order to provide means for operating the valve and locking it in closed position against the valve seat, such valve is provided with a slot *y* which extends transversely therethrough. Through this slot extends a centrally cranked portion *z* of a crank shaft 2, which shaft is mounted at right angles to the bore in which the valve is mounted. Each end of this crank shaft is journaled in the main body portion of the faucet a sufficient distance above the bottom of the slot *y* in the valve to permit the cranked portion of the shaft to pass downward beyond the pivotal center thereof, so as to lock the valve in closed position when the cranked portion of the shaft is in its lowered position and cause the valve to move rearwardly with the cranked portion of the shaft to its open position entirely out of the discharge passage when the cranked portion of the shaft is in its raised position. A suitable operating lever 3, having two arms extending to the opposite sides of the main body portion of the faucet, is mounted in operative engagement with the crank shaft. One of the arms 4 is rotatably mounted upon a projecting portion 4' of the shell or main body portion of the valve, and the other is mounted upon the squared end 5 of the crank axle so that the movement of the lever will rotate the axle and thereby cause the movement of the valve in a corresponding direction, either to open or closed position. The end of each arm of the operating lever is provided with an annular shoulder 6, and a thumb nut 7 is mounted at one end of the crank shaft in threaded engagement with the main body portion of the faucet and provided with an annular shoulder 8 which encircles the annular shoulder 6 on the adjacent end of the operating lever. A similar thumb nut 9 is mounted at the opposite end of the crank shaft in threaded engagement with the shaft and is provided with a similar annular shoulder encircling the corresponding shoulder 6 of the operating lever. To permit the crank shaft to be readily inserted in position, one side of the main body or shell portion of the faucet is bored out so as to provide an opening of sufficient size to admit the crank shaft therethrough, and a circular bushing 10 having external threads 11 is mounted in such opening in threaded engagement with the main body portion of the faucet and is provided with a central smooth bore 12 in which one end of the crank shaft is journaled. Suitable washers 13 may be mounted at either or both ends of the shaft so as to form an air tight connection between the movable parts and the main body portion of the faucet. By this arrangement it will be seen that the movement of the operating lever to its upright position, as shown in dotted lines in Fig. 1, will throw the crank of the crank shaft to its lower position, thereby forcing the valve into engagement with the valve seat *r* so as to close the discharge passage. It will also be observed that when the crank has reached its lowermost position it is past its pivotal center and therefore locks the valve in closed position. When the operating lever is moved to the position shown in full lines in Fig. 1, such movement will cause the crank to engage the front wall of the slot *y* pressing the valve forward to its open position, and when the valve is in this position the discharge passage is entirely free from all obstructions and the liquid is free to flow therethrough without being agitated by flowing around or through a valve or other obstruction as in the case of ordinary and well-known devices. The objectionable foaming of the liquid due to obstructions in the discharge passage is thus avoided. It will also be appreciated by those skilled in the art that the conical sleeve *f* being sufficiently large to provide a space between a large portion of its inner surface and the stem of the faucet prevents such sleeve from becoming damp or "sweating" so that it may be readily kept dry and hence bright and ornamental in its appearance.

I claim:

1. In a faucet of the class described, the combination of a stem provided with a passageway, a valve seat surrounding the passageway at one end thereof, a guide spaced from the said passageway in alinement therewith, a valve slidably mounted in said guide, and a branch discharge conduit between the said seat and guide, said valve comprising a valve head adjustable toward and from the main body of the valve member, and an expansible packing ring within the guide between the valve head and said main body of the valve member.

2. In a faucet of the class described, the combination of a main body portion provided with a discharge passage and having a bore converging with such passage, a valve seat opposite such bore, a valve slidably mounted in such bore and movable into engagement with the valve seat when in closed position and entirely out of the discharge passage when in open position, a crank shaft extending transversely of the valve with its cranked portion in sliding engagement therewith, and an operating lever having one arm in operative engagement with the crank shaft and the other rotatably mounted upon a projecting portion of the main body of the faucet, substantially as described.

FRANK GRUSCHOW.

Witnesses:
 THOMAS F. SHERIDAN,
 ANNIE C. COURTENAY.